(12) United States Patent
Ha et al.

(10) Patent No.: US 10,454,115 B2
(45) Date of Patent: Oct. 22, 2019

(54) POROUS CARBON MATERIALS AND METHODS OF MANUFACTURING THE SAME

(71) Applicant: KOREA INSTITUTE OF SCIENCE AND TECHNOLOGY, Seoul (KR)

(72) Inventors: Heung Yong Ha, Seoul (KR); Hyuck Lee, Seoul (KR); Jinyeon Hwang, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 192 days.

(21) Appl. No.: 15/335,775

(22) Filed: Oct. 27, 2016

(65) Prior Publication Data

US 2017/0133690 A1 May 11, 2017

(30) Foreign Application Priority Data

Nov. 5, 2015 (KR) .................. 10-2015-0154963

(51) Int. Cl.

| | |
|---|---|
| *H01M 4/96* | (2006.01) |
| *H01M 10/20* | (2006.01) |
| *C01B 32/00* | (2017.01) |
| *C01B 32/16* | (2017.01) |
| *C01B 32/18* | (2017.01) |
| *B01J 37/08* | (2006.01) |
| *B01J 23/745* | (2006.01) |
| *B01J 23/75* | (2006.01) |
| *B01J 23/755* | (2006.01) |
| *B01J 37/02* | (2006.01) |
| *H01M 8/18* | (2006.01) |
| *B01J 35/06* | (2006.01) |

(52) U.S. Cl.
CPC ............ *H01M 4/96* (2013.01); *B01J 23/745* (2013.01); *B01J 23/75* (2013.01); *B01J 23/755* (2013.01); *B01J 37/0203* (2013.01); *B01J 37/0207* (2013.01); *B01J 37/08* (2013.01); *C01B 32/00* (2017.08); *C01B 32/16* (2017.08); *C01B 32/18* (2017.08); *B01J 35/06* (2013.01); *C01P 2006/12* (2013.01); *H01M 8/188* (2013.01); *Y02E 60/528* (2013.01); *Y02P 70/56* (2015.11)

(58) Field of Classification Search
CPC ...... H01M 4/96; H01M 8/188; B01J 37/0207; B01J 37/0203; B01J 23/755; B01J 23/75; B01J 23/745; B01J 37/08; B01J 35/06; C01B 32/16; C01B 32/00; C01B 32/18; Y02P 70/56; C01P 2006/12; Y02E 60/528
See application file for complete search history.

(56) References Cited

U.S. PATENT DOCUMENTS

| | | | |
|---|---|---|---|
| 2011/0206932 A1 | 8/2011 | Waki et al. | |
| 2012/0264034 A1 | 10/2012 | Waki et al. | |
| 2013/0230709 A1* | 9/2013 | Zhou | H01G 11/36 428/219 |
| 2014/0183415 A1 | 7/2014 | Song | |
| 2014/0272199 A1* | 9/2014 | Lin | H01L 51/444 427/600 |

FOREIGN PATENT DOCUMENTS

| | | |
|---|---|---|
| KR | 10-2010-0123205 A | 11/2010 |
| KR | 10-2014-0055713 A | 5/2014 |
| KR | 10-2014-0083006 A | 7/2014 |
| KR | 10-2014-0106087 A | 9/2014 |
| WO | WO 2013/050785 A1 | 4/2013 |

OTHER PUBLICATIONS

Maya Lukas, et al., "Catalytic subsurface etching of nanoscale channels in graphite," *Nature Communications*, Jan. 22, 2013, pp. 1-8.

* cited by examiner

*Primary Examiner* — Muhammad S Siddiquee
(74) *Attorney, Agent, or Firm* — NSIP Law

(57) ABSTRACT

Provided is a porous carbon material having carbon nano-rods on the surface thereof. The porous carbon material has an increased specific surface area and an increased electro-chemically active area, and thus may be expected to provide improved performance, when used as an electrode for electrochemical reactions. In addition, the carbon nano-rods of the porous carbon material are formed through an etching process using a catalyst for etching formed on the carbon material, and thus the carbon material may have various functions.

18 Claims, 8 Drawing Sheets

POROUS CARBON MATERIALS AND METHODS OF MANUFACTURING THE SAME

DESCRIPTION ABOUT NATIONAL SUPPORT RESEARCH AND DEVELOPMENT

This study is made by the support of Ministry of Trade Industry and Energy, and the subject name thereof is Development of Materials that selectively transport ion for redox flow batteries (RFB) having energy storage purposes (Subject Identification No.:1415136580).

CROSS-REFERENCE TO RELATED APPLICATION

This application claims priority to Korean Patent Application No. 10-2015-0154963, filed on Nov. 5, 2015, and all the benefits accruing therefrom under 35 U.S.C. § 119, the contents of which in its entirety are herein incorporated by reference.

BACKGROUND

1. Field

The present disclosure relates to a porous carbon material and a method for manufacturing the same. More particularly, the present disclosure relates to a carbon material having a high specific surface area and a method for manufacturing the same.

2. Description of the Related Art

Carbon materials have excellent chemical resistance, durability and thermal and electrical conductivity and also are favorable in terms of cost as compared to the other materials, and thus are used widely in various industrial fields. Particularly, carbon materials, such as graphene, carbon nanotubes and fullerene, having a nanostructure show specific physicochemical properties, and thus have been applied to various industrial fields, including energy materials, sensors, optical devices, electrodes, display materials, semiconductors, or the like. In the case of carbon nanotubes that are typical one-dimensional nanostructures, they may be obtained through a process using arc discharge, process using laser, process using carbon monoxide (CO) under high temperature and high pressure conditions, or a thermal chemical vapor deposition process. Such processes are carried out at high temperature or under vacuum-based or inert atmosphere, and thus require relatively high processing cost. In addition, when nanotubes are grown with a catalyst, densified uniform carbon nanotubes may be arranged. However, in this case, there are problems in that the structure of nanotubes may be affected by the catalyst, an additional carbon source is required, and the binding force between carbon nanotubes is limited.

As a method for controlling the surface structure of a carbon material, there has been disclosed a technology of forming nano-sized channels on graphene or graphite by using a catalyst. The technology allows nano-patterning of a carbon material through hydrogenation of carbon in graphite or graphene using a catalyst. In addition, the technology determines an etching direction depending on a carbon crystal structure and thus may not be controlled with ease. Further, the technology is carried out at high temperature under inert gas atmosphere, and thus is limited in its application.

Another method for etching a carbon material includes oxidizing carbon with a metal oxide or metal nitride catalyst to form holes on carbon nanotube walls at relatively low temperature under air and to improve the electrochemically active area. However, the method merely suggests increasing the surface area of carbon nanotubes and does not include any particular information about methods for pretreating a carbon material with a metal oxide catalyst, methods for preparing a metal oxide catalyst, and a degree of surface etching depending on condition of treating a carbon material. In addition, the method accomplishes an increase in active area merely by forming holes on the walls and does not disclose sufficiently about controlling an aligned structure or application to a complicated three-dimensional structure as disclosed herein.

REFERENCES

Patent Documents (Patent Document 1) US2011-0206932 A1

Non-Patent Documents (Non-Patent Document 1) Nature Communications 4, 1379 (doi: 10.1038/ncomms2399)

SUMMARY

The present disclosure is directed to providing a porous carbon material having a high specific surface area and excellent electrochemical activity.

The present disclosure is also directed to providing a method for manufacturing the porous carbon material.

In one aspect, there is provided a porous carbon material having carbon nano-rods on the surface thereof.

According to an embodiment, the carbon nano-rods may have a height of 10 nm-50 μm and a diameter of 2-1,000 nm, a plurality of carbon nano-rods may be present, and each carbon nano-rod may be spaced apart from the adjacent carbon nano-rods by a distance of 2-1,000 nm.

According to another embodiment, the porous carbon material may have a porosity of 1-98%.

According to still another embodiment, the porous carbon material may have a specific surface area of 0.5-3,000 $m^2/g$.

According to still another embodiment, the carbon nano-rods may be formed by etching a carbon material.

According to still another embodiment, the porous carbon material may further include carbon nanotubes formed in the pores or on the surface of the carbon nano-rods.

According to yet another embodiment, the carbon material may include at least one selected from the group consisting of carbon felt, carbon paper, carbon cloth, carbon fibers, hollow carbon fibers, carbon nanotubes, graphene fibers, graphene sheets, graphene oxide fibers, graphene oxide sheets, graphite plates, graphite powder, graphite sheets, carbon black powder, active carbon powder and composite graphite including a polymer in combination with graphite.

In another aspect, there is provided an electrode for electrochemical reaction, which includes the porous carbon material.

In still another aspect, there is provided an electrochemical cell including the electrode for electrochemical reaction.

In still another aspect, there is provided an electrochemical conversion process using the electrode for electrochemical reaction.

In still another aspect, there is provided a method for manufacturing a porous carbon material, including: providing a catalyst for etching to the surface of a carbon material; and etching the carbon material at the region provided with the catalyst for etching to obtain a porous carbon material having carbon nano-rods formed on the surface thereof.

According to an embodiment, the catalyst for etching may include at least one selected from the group consisting of nickel (Ni), cobalt (Co), iron (Fe), manganese (Mn), ruthenium (Ru), vanadium (V), titanium (Ti), chromium (Cr), copper (Cu), zinc (Zn), tin (Sn), aluminum (Al), silicon (Si), rhodium (Rh), molybdenum (Mo), zirconium (Zr), tungsten (W), osmium (Os), iridium (Ir) and oxides thereof.

According to another embodiment, the catalyst for etching may further include a cocatalyst, wherein the cocatalyst may include at least one selected from the group consisting of lithium (Li), potassium (K), sodium (Na), rubidium (Rb), cesium (Ce), magnesium (Mg), calcium (Ca), strontium (Sr), barium (Ba) and radium (Ra).

According to still another embodiment, the porous carbon material may have a specific surface area of 0.5-3,000 m$^2$/g.

According to still another embodiment, the method for manufacturing a porous carbon material may include: pretreating a carbon material to perform surface modification of the surface thereof; dispersing a catalyst precursor on the pretreated carbon material; heat-treating the catalyst precursor at a temperature of 100-800° C. to form a catalyst for etching on the surface of the carbon material; and heat-treating the carbon material having the catalyst for etching thereon at a temperature of 250-1,000° C. to form a porous carbon material having carbon nano-rods on the surface thereof.

According to still another embodiment, the surface modification may be carried out at a temperature of 200-900° C.

According to still another embodiment, the catalyst precursor may include at least one selected from the group consisting of metal nitrates, metal acetates, metal sulfates, metal carbonates, metal oxides and metal chlorides.

According to still another embodiment, the carbon material may be etched partially to form the carbon nano-rods, when the carbon material having the catalyst for etching thereon is heat-treated.

According to still another embodiment, the method may further include, after the porous carbon material is obtained, dispersing a catalyst for forming carbon nanotubes to the porous carbon material, followed by reaction with a carbon source to form carbon nanotubes in the pores or on the surface of the carbon nano-rods.

According to still another embodiment, the catalyst for forming carbon nanotubes may include at least one selected from the group consisting of nickel (Ni), cobalt (Co), iron (Fe), manganese (Mn), ruthenium (Ru), vanadium (V), titanium (Ti), chromium (Cr), copper (Cu), zinc (Zn), tin (Sn), aluminum (Al), silicon (Si), rhodium (Rh), molybdenum (Mo), zirconium (Zr), tungsten (W), osmium (Os), iridium (Ir) and oxides thereof.

According to yet another embodiment, the catalyst for forming carbon nanotubes may further include a cocatalyst, wherein the cocatalyst may include at least one selected from the group consisting of lithium (Li), potassium (K), sodium (Na), rubidium (Rb), cesium (Ce), magnesium (Mg), calcium (Ca), strontium (Sr), barium (Ba) and radium (Ra).

The porous carbon material obtained according to an embodiment of the present disclosure has a high specific surface area and thus may have a high electrochemically active area. Therefore, when the porous carbon material is applied to an electrode for electrochemical reaction, it is possible to expect improvement of performance. In addition, the porous carbon material may be provided with an additional function depending on the catalyst for etching, and thus may be manufactured to have various properties. As a result, the porous carbon material may be applied to various industrial fields.

In addition, the method for manufacturing the porous carbon material is carried out under ambient pressure, uses no special gases, requires no ultrahigh temperature, and thus shows high cost-efficiency. Further, when a catalyst is applied to the surface of the carbon material, a wet process is used to allow the surface control of the carbon material having a three-dimensional structure and to provide a uniform surface control technology applicable to general carbon materials. As a result, the method may be applied even to the carbon materials having a complicated structure.

BRIEF DESCRIPTION OF THE DRAWINGS

FIG. 2A shows carbon felt (Comparative Example 1) heat-treated at 500° C., FIG. 2B shows the surface of carbon felt (Comparative Example 2) subjected to the process of FIG. 1 while not applying a catalyst for etching, and FIG. 2C shows the surface structure of a porous carbon material (Example 1: etching temperature 400° C.) subjected to surface etching using a catalyst for etching.

FIG. 5A is an SEM image illustrating the surface of the porous carbon material etched at a temperature of 200° C. In addition, FIG. 5B is an SEM image illustrating the surface of the porous carbon material etched at a temperature of 500° C.

FIG. 6A is an SEM image illustrating the surface of the porous carbon material when the etching time is 30 minutes. FIG. 6B is an SEM image illustrating the surface of the porous carbon material when the etching time is 1 hour. In addition, FIG. 6C is an SEM image illustrating the surface of the porous carbon material when the etching time is 2 hours.

FIG. 7A is an SEM image illustrating the surface of the porous carbon material, when cobalt nitrate is used as a precursor. FIG. 7B is an SEM image illustrating the surface of the porous carbon material, when nickel acetate is used as a precursor. FIG. 7C is an SEM image illustrating the surface of the porous carbon material, when iron nitrate is used as a precursor. FIG. 7D is an SEM image illustrating the surface of the porous carbon material, when manganese acetate is used as a precursor.

DETAILED DESCRIPTION

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein.

As used herein, 'carbon material' is a generic term that means carbon-containing materials, such as graphite, carbon nanotubes, carbon felt, carbon paper, carbon cloth, or the like.

As used herein, 'porous carbon material' means a carbon material formed by partial etching of a carbon material through an etching process using a catalyst for etching, and a carbon material having carbon nano-rods on the surface thereof.

As used herein, 'carbon nano-rods', mean a carbon material formed on the surface of the porous carbon material, which have a shape of a column.

Method for Manufacturing Porous Carbon Material

In one aspect, there is provided a method for manufacturing a porous carbon material, including: providing a catalyst for etching to the surface of a carbon material; and etching the carbon material at the region provided with the catalyst for etching to obtain a porous carbon material having carbon nano-rods formed on the surface thereof.

Particularly, the method for manufacturing a porous carbon material may include: pretreating a carbon material to carry out surface modification thereof; dispersing a catalyst precursor on the pretreated carbon material; heat-treating the catalyst precursor at a temperature of 100-800° C. to form a catalyst for etching on the surface of the carbon material; and heat-treating the carbon material having the catalyst for etching thereon at a temperature of 250-1,000° C. to form a porous carbon material having carbon nano-rods on the surface thereof.

Figure 1:
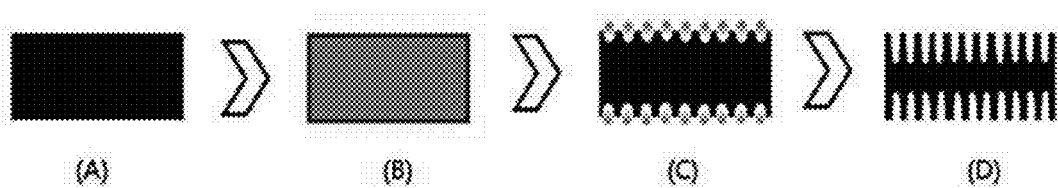
FIG. 1 is a schematic view illustrating the method for manufacturing a porous carbon material according to an embodiment.

FIG. 1 is a schematic view illustrating each of the operations of the method for manufacturing a porous carbon material. Hereinafter, the present disclosure will be explained in more detail with reference to FIG. 1.

First, the surface of a carbon material is pretreated to carry out surface modification. The pretreatment step is intended to introduce a functional group for adsorbing or binding a catalyst precursor to the surface of the carbon material.

According to an embodiment, the pretreatment may be carried out through a heat-treatment process, chemical treatment process, physical treatment process, or the like.

According to another embodiment, the pretreatment process may be a heat-treatment process carried out by introducing the carbon material to a heating furnace under air and heating the carbon material at a temperature ranging from 200° C. to 900° C. for 5 minutes to 12 hours. Particularly, the total heating time may be 12 hours or less. Through the heating process, the surface of the carbon material is modified to form a functional group adsorbed or bound to a catalyst precursor with ease.

According to still another embodiment, the chemical treatment process may be carried out by surface modification using an acidic material, such as hydrochloric acid, hydrosulfuric acid, nitric acid or hydrogen peroxide, an alkaline material, such as sodium hydroxide, potassium hydroxide or aqueous ammonia, or the like. In addition, it is possible to add a functional group through an organic solvent. Further, the physical treatment process may be carried out by subjecting the carbon material to plasma treatment.

Meanwhile, the pretreatment may be carried out by using a heat-treatment process, chemical treatment process and a physical treatment process alone or in combination.

According to still another embodiment, the carbon material may include at least one selected from the group consisting of carbon felt, carbon paper, carbon cloth, carbon fibers, hollow carbon fibers, carbon nanotubes, graphene fibers, graphene sheets, graphene oxide fibers, graphene oxide sheets, graphite plates, graphite powder, graphite sheets, carbon black powder, active carbon powder and composite graphite including a polymer in combination with graphite.

Next, a catalyst precursor is dispersed on the surface of the pretreated carbon material.

Particularly, the pretreated carbon material may be introduced to a precursor solution containing a catalyst precursor and a solvent, followed by agitation, so that the catalyst precursor may be adsorbed onto or infiltrated into the carbon material with ease.

According to still another embodiment, the catalyst precursor may include metal nitrates, metal acetates, metal sulfates, metal carbonates, metal oxides and metal chlorides. For example, the catalyst precursor may include at least one selected from the group consisting of cobalt acetate, cobalt nitrate, cobalt chloride, nickel acetate, nickel nitrate, nickel chloride, iron nitrate, iron chloride, manganese acetate, manganese nitrate, manganese chloride, ruthenium (Ru), vanadium (V), titanium (Ti), chromium (Cr), copper (Cu), zinc (Zn), tin (Sn), aluminum (Al), silicon (Si), rhodium (Rh), molybdenum (Mo), zirconium (Zr), tungsten (W), osmium (Os), iridium (Ir), or the like.

According to still another embodiment, the concentration of the catalyst precursor may be determined by the type of the catalyst precursor. In addition, it is possible to adjust the size range of the finished catalyst depending on the concentration of the catalyst precursor.

According to still another embodiment, an amphiphilic solvent, such as an alcohol, may be used in combination with water as solvent in order to increase the wetness on the hydrophobic carbon material surface and to facilitate adsorption of the catalyst precursor.

Meanwhile, a surfactant may be further added to obtain uniform dispersibility of the carbon material. The surfactant may be selected from a cationic surfactant, anionic surfactant, amphoteric surfactant and a nonionic surfactant. Particular examples of the surfactant may include cetyltrimethylammonium bromide (CTAB), sodium dodecylbenzene sulfonate (SDBS), sodium lauryl sulfate (SLS), polyethylene oxide-polypropylene oxide (PEO-PPO) block copolymer, betaine compounds, alcohol compounds, or the like.

According to still another embodiment, the dispersion may be carried out for about 5 minutes to 12 hours so that the carbon material may be impregnated with the catalyst precursor effectively. Therefore, the carbon material may be impregnated with the catalyst precursor effectively. After that, the carbon material may be dried under air for at least 12 hours.

Then, the catalyst precursor may be heat-treated to form a catalyst for etching on the surface of the carbon material.

Particularly, the carbon material impregnated with the precursor may be introduced into a heating furnace and heat-treated under adequate gas atmosphere to form a metal or metal oxide.

Herein, it is possible to adjust the shape and dispersibility of the catalyst depending on heat-treatment temperature and time.

According to still another embodiment, the catalyst preparation may be carried out at a temperature ranging from 100 to 800° C. Particularly, the catalyst preparation may be carried out at a temperature ranging from 200 to 300° C. When the temperature is lower than 100° C., catalyst particles may not be formed. When the temperature is higher than 800° C., catalyst particles may be formed to have an excessively large size or an undesired change may appear in the structure of the carbon material.

Meanwhile, the catalyst preparation may be carried out for a time ranging from 5 minutes to 5 hours. When the time is less than 5 minutes, catalyst particles may not be formed. When the time is more than 5 hours, catalyst particles may be formed to have an excessively large size or an undesired increase in cost may occur.

According to an embodiment, the catalyst for etching may include at least one selected from the group consisting of nickel (Ni), cobalt (Co), iron (Fe), manganese (Mn), ruthenium (Ru), vanadium (V), titanium (Ti), chromium (Cr), copper (Cu), zinc (Zn), tin (Sn), aluminum (Al), silicon (Si), rhodium (Rh), molybdenum (Mo), zirconium (Zr), tungsten (W), osmium (Os), iridium (Ir) and oxides thereof.

Meanwhile, the catalyst for etching may further include a cocatalyst that functions to accelerate etching of carbon and to change the porous structure of carbon, wherein the cocatalyst may include at least one selected from the group consisting of lithium (Li), potassium (K), sodium (Na), rubidium (Rb), cesium (Ce), magnesium (Mg), calcium (Ca), strontium (Sr), barium (Ba) and radium (Ra).

After that, the catalyst for etching is used to etch the surface of the carbon material.

Particularly, the carbon material impregnated with the catalyst for etching may be subjected to additional heat-treatment to carry out etching of the carbon material. Thus, it is possible to form a porous carbon material having carbon nano-rods on the surface thereof.

According to still another embodiment, the etching may be carried out at a temperature ranging from 250 to 1,000° C. Particularly, the etching may be carried out at a temperature ranging from 350 to 600° C. When the etching is carried out at a temperature lower than 250° C., it is not possible to carry out etching to a desired degree. When the etching is carried out at a temperature higher than 1,000° C., etching may be carried out excessively, resulting in collapse of carbon structure. Meanwhile, when the temperature condition is changed, the finally formed carbon nano-rods may have a different shape.

According to still another embodiment, the etching may be carried out for a time ranging from 5 minutes to 5 hours. When the etching time is less than 5 minutes, it is not possible to carry out etching sufficiently. When the etching time is more than 5 hours, etching may be carried out excessively or a significant increase in cost may occur. Meanwhile, when the etching time is changed, the finally formed carbon nano-rods may have a different shape.

According to still another embodiment, during the etching, at least one gas selected from the group consisting of oxygen, nitrogen, carbon dioxide, hydrogen, water and argon may be added to the reaction container. In addition, it is possible to control the etching degree of the carbon material by adjusting the proportion of the gas. In this case, the finally formed carbon nano-rods of the porous carbon material may have a different shape.

Meanwhile, the operation of forming a catalyst for etching on the surface of a carbon material and the operation of etching the carbon material may be carried out at the same time.

As a result, a porous carbon material having carbon nano-rods on the surface thereof may be formed.

According to still another embodiment, a plurality of carbon nano-rods may be formed.

After that, although it is not shown in the figures, an additional process may be carried out to form carbon nanotubes additionally in the pores or on the surface of the porous carbon material.

Particularly, a catalyst for forming carbon nanotubes is dispersed into the pores or onto the surface of the porous carbon material having carbon nano-rods thereon. Then, the porous carbon material may be introduced to a high-temperature reactor and a carbon source is injected thereto to form carbon nanotubes in the pores or on the surface of the porous carbon material through a chemical vapor deposition (CVD) process.

According to still another embodiment, the carbon source may include at least one selected from the group consisting of methane, ethane, propane, butane, butylene, acetylene, propylene, or the like.

According to still another embodiment, the catalyst for forming carbon nanotubes may include at least one selected from the group consisting of nickel (Ni), cobalt (Co), iron (Fe), manganese (Mn), ruthenium (Ru), vanadium (V), titanium (Ti), chromium (Cr), copper (Cu), zinc (Zn), tin (Sn), aluminum (Al), silicon (Si), rhodium (Rh), molybdenum (Mo), zirconium (Zr), tungsten (W), osmium (Os), iridium (Ir) and oxides thereof.

According to still another embodiment, the catalyst for forming carbon nanotubes may further include a cocatalyst, wherein the cocatalyst may include at least one selected from the group consisting of lithium (Li), potassium (K), sodium (Na), rubidium (Rb), cesium (Ce), magnesium (Mg), calcium (Ca), strontium (Sr), barium (Ba) and radium (Ra).

Meanwhile, the catalyst for forming carbon nanotubes may further include a cocatalyst for accelerating the growth rate of carbon nanotubes or controlling the shape of carbon nanotubes, wherein the cocatalyst may include at least one selected from the group consisting of lithium (Li), potassium (K), sodium (Na), rubidium (Rb), cesium (Ce), magnesium (Mg), calcium (Ca), strontium (Sr), barium (Ba) and radium (Ra).

As described above, the porous carbon material obtained according to an embodiment may be formed to have a high specific surface area, and thus to provide a high electrochemically active area. The method for manufacturing a porous carbon material is carried out under ambient pressure, uses no special gas and requires no ultrahigh temperature, thereby providing an advantage of high cost-efficiency. In addition, the method uses a wet process when applying a catalyst to the surface of the carbon material. Thus, it is possible to obtain a porous carbon material having carbon nano-rods formed on the surface thereof by using a carbon material having a complicated structure.

Further, according to the method for manufacturing a porous carbon material, the shape of the nanostructure formed on the carbon surface may be affected by the concentration of a catalyst precursor for etching, the dispersibility of a catalyst for etching and the size of catalyst particles. Thus, when such conditions are changed, the surface structure of the carbon material may be controlled to a desired shape. Therefore, it is possible to obtain porous carbon materials having various shapes. In addition, it is possible to change the surface structure of a porous carbon material by adjusting the temperature and time while the catalyst is etched, and thus to obtain porous carbon materials having various shapes.

Porous Carbon Material

In another aspect, there is provided a porous carbon material having carbon nano-rods on the surface thereof.

The porous carbon material has carbon nano-rods formed on the surface thereof, and may have high porosity and a high specific surface area. Thus, the porous carbon material may provide high performance, when used as an electrode for electrochemical reaction by virtue of an increase in electrochemically active surface area.

In addition, the carbon nano-rods are etched by using a catalyst for etching, and the porous carbon material may be provided with additional functions depending on the type of the catalyst. Thus, it is possible to obtain carbon materials having various properties. Such additional functions may include those as an electrode for use in fuel cells or electrochemical conversion processes or as an electrode for secondary batteries.

Hereinafter, the porous carbon material will be explained in more detail.

According to an embodiment, the carbon material may include at least one selected from the group consisting of carbon felt, carbon paper, carbon cloth, carbon fibers, hollow carbon fibers, carbon nanotubes, graphene fibers, graphene sheets, graphene oxide fibers, graphene oxide sheets, graphite plates, graphite powder, graphite sheets, carbon black powder, active carbon powder and composite graphite including a polymer in combination with graphite.

According to another embodiment, the carbon nano-rods may be formed by etching the carbon material having the catalyst for etching formed on the surface thereof.

According to still another embodiment, the catalyst for etching may include at least one selected from the group consisting of nickel (Ni), cobalt (Co), iron (Fe), manganese (Mn), ruthenium (Ru), vanadium (V), titanium (Ti), chromium (Cr), copper (Cu), zinc (Zn), tin (Sn), aluminum (Al), silicon (Si), rhodium (Rh), molybdenum (Mo), zirconium (Zr), tungsten (W), osmium (Os), iridium (Ir) and oxides thereof.

According to still another embodiment, the catalyst for etching may further include a cocatalyst, wherein the cocatalyst may include at least one selected from the group consisting of lithium (Li), potassium (K), sodium (Na), rubidium (Rb), cesium (Ce), magnesium (Mg), calcium (Ca), strontium (Sr), barium (Ba) and radium (Ra).

According to still another embodiment, the carbon nano-rods may have a height of 10 nm-50 μm and a diameter of 2-1,000 nm. In addition, a plurality of carbon nano-rods may be formed and each carbon nano-rod may be spaced apart from the adjacent carbon nano-rods by a distance of 2-1,000 nm. As a result, the porous carbon material may have an increased specific surface area and may provide an increased electrochemically active surface area.

According to still another embodiment, the porous carbon material may have a specific surface area of 0.5-3,000 $m^2/g$. When the specific surface area is smaller than 0.5 $m^2/g$, it is difficult to expect the function of the porous carbon material as an electrode. When the specific surface area is larger than 3,000 $m^2/g$, the structure of the carbon material becomes unstable and thus it is not possible to provide sufficient advantages derived from an increase in specific surface area.

In addition, the porous carbon material may have a porosity of 1-98%. When the porosity is less than 1%, it is not possible to obtain an effect derived from an increase in specific surface area. When the porosity is larger than 98%, the carbon material may undergo degradation of structural stability.

Exemplary embodiments now will be described more fully hereinafter with reference to the accompanying drawings, in which exemplary embodiments are shown for illustrative purposes only. The present disclosure may, however, be embodied in many different forms and should not be construed as limited to the exemplary embodiments set forth therein.

EXAMPLES

Example 1: Manufacture of Porous Carbon Material

A catalyst is supported on carbon felt, followed by heat-treatment, and then etching is carried out by using the catalyst to form nano-structures on the surface of the carbon felt. First, carbon felt is introduced to a heating furnace, heated under air from room temperature at a rate of 10° C./min, maintained at 500° C. for 4 hours, and cooled down to room temperature. The pretreated carbon felt is dipped in aqueous ethanol solution containing cobalt acetate hydrate as a precursor of catalyst for etching for 1 hour and dried at room temperature under air for 12 hours. Then, the carbon felt having the metal oxide precursor adsorbed on the surface thereof is introduced to a heating furnace, warms under air from room temperature at a rate of 10° C./min and maintained at 300° C. for 1 hour to prepare a metal oxide. After that, the carbon felt having the metal oxide catalyst supported thereon is heated again under air from room temperature at a rate of 10° C./min, and maintained at 400° C. for 1 hour to form porous nano-structures having the shape of a plurality of carbon nano-rods on the surface through the surface etching of carbon felt in the presence of the metal oxide catalyst.

Examples 2 and 3

Example 1 is repeated, except that the temperature during the etching process is set to 200° C. and 500° C. instead of 400° C. to provide the porous carbon materials according to Examples 2 and 3.

Examples 4 and 5

Example 1 is repeated, except that the processing time during the etching process is set to 30 minute and 2 hours instead of 1 hour to provide the porous carbon materials according to Examples 4 and 5.

Examples 6-9

Example 1 is repeated, except that cobalt nitrate, nickel acetate, iron nitrate and manganese acetate are used as the precursors of the catalyst for etching instead of cobalt acetate to provide the porous carbon materials according to Examples 6-9.

Example 10

Example 1 is repeated, except that the carbon felt having the precursor of the catalyst for etching adsorbed on the surface thereof is introduced to a heating furnace, heated under air from room temperature at a rate of 10° C./min, and maintained at 400° C. for 1 hour or 2 hours so that synthesis of a catalyst for etching may be carried out simultaneously with etching. In this manner, the porous carbon material according to Example 10 is provided.

Comparative Example 1

Bare carbon felt having no catalyst for etching is introduced to a heating furnace, heated under air from room temperature at a rate of 10° C./min, and maintained at 500° C. for 4 hours.

Comparative Example 2

Example 1 is repeated to carry out heat-treatment of carbon felt, except that no catalyst precursor is supported on the carbon felt.

In other words, in the same manner as Comparative Example 1, bare carbon felt is introduced to a heating furnace, warmed under air from room temperature at a rate of 10° C./min, heat-treated at 500° C. for 4 hours, and then cooled to room temperature (pretreatment process for carbon felt). In addition, the pretreated carbon felt is heated under air at a rate of 10° C./min, maintained at 300° C. for 1 hour, and cooled naturally to room temperature (heat-treatment conditions while the catalyst is supported on the carbon felt; no catalyst is supported in the carbon felt herein). Then, the carbon felt is warmed again under air at a rate of 10° C./min, maintained at 400° C. for 1 hour, and cooled to room temperature (heat-treatment is carried out in the same manner as the process for etching the carbon surface).

Test Example 1: Determination of Surface Structure of Porous Carbon Material

Figure 2A:
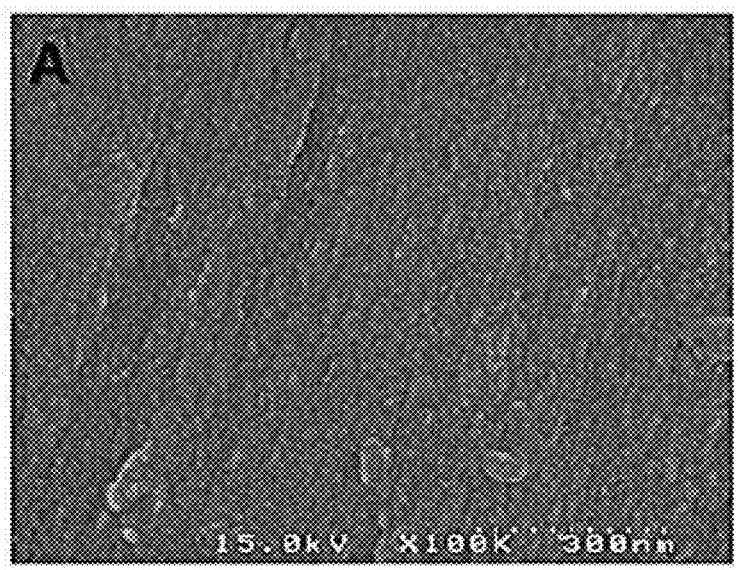
FIG. 2A-FIG. 2C are scanning electron microscopic (SEM) images illustrating a change in surface of a carbon material depending on the presence of a catalyst for etching. Particularly.
Figure 2B:
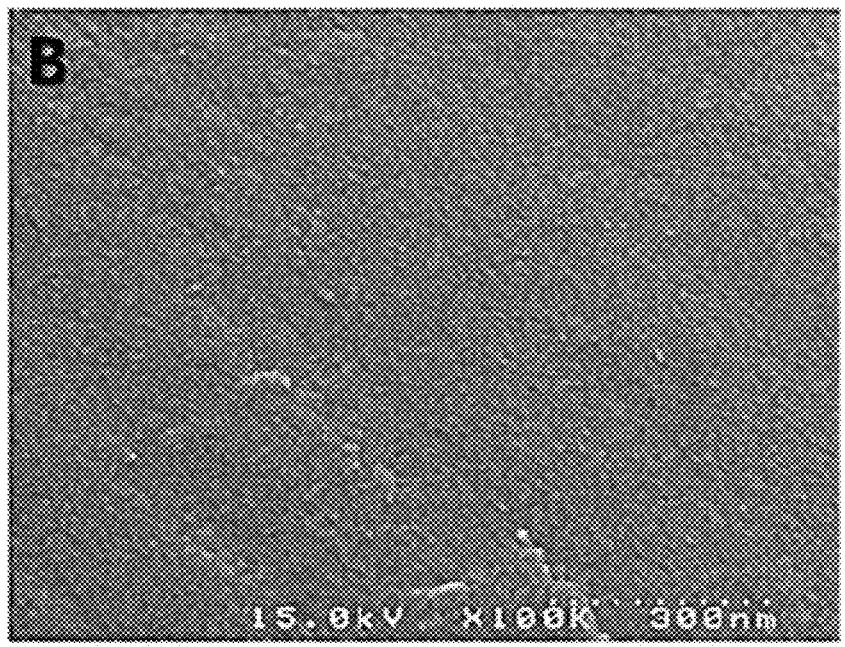
Figure 2C:
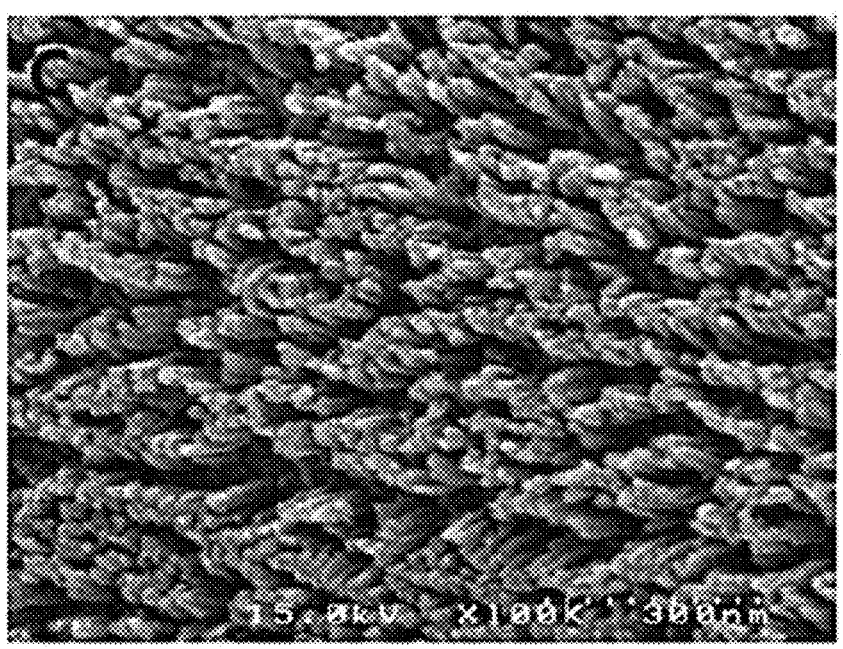
Figure 3:
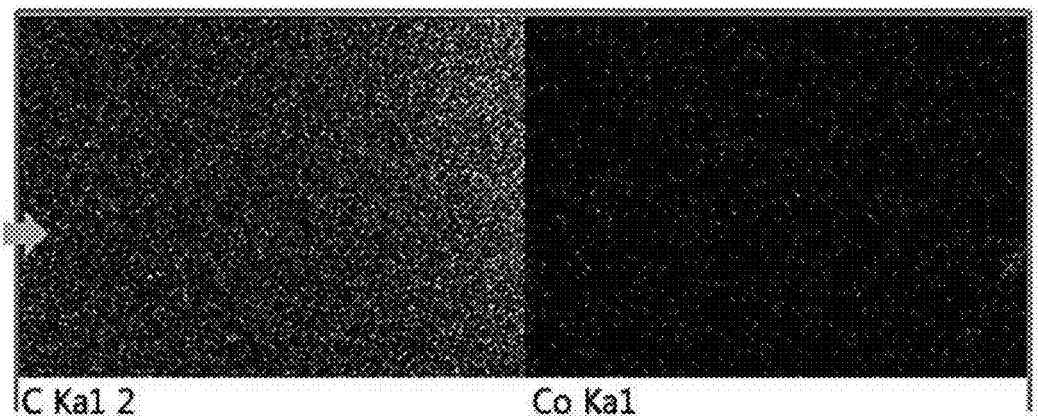
FIG. 3 illustrates the energy dispersive X-ray analysis (EDAX) element distribution diagram of the surface of an etched carbon felt (porous carbon material).
Figure 4:
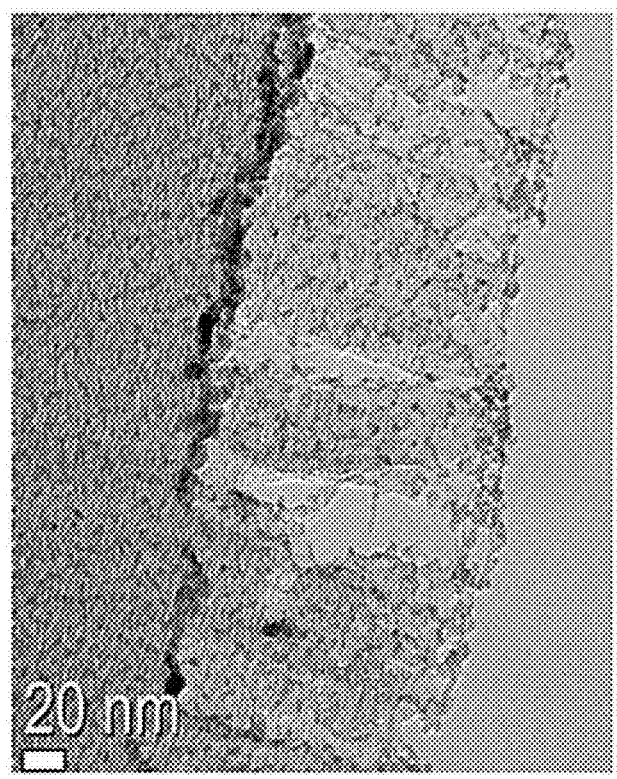
FIG. 4 is a transmission electron microscopic (TEM) image of the crossection of an etched carbon felt.

The porous carbon materials according to Comparative Examples 1 and 2 and the carbon felt according to Example 1 are observed for their surfaces by using an electron microscope, and the results are shown in FIG. 2A-FIG. 2C. In addition, the surface structure of the porous carbon material according to Example 1 is subjected to EDAX mapping and the results are shown in FIG. 3. Further, the surface structure is also observed by using TEM and the results are shown in FIG. 4.

FIG. 2A-FIG. 2C are scanning electron microscopic (SEM) images illustrating a change in surface of a carbon material depending on the presence of a metal oxide. Particularly, FIG. 2A shows carbon felt heat-treated at 500° C. (Comparative Example 1), FIG. 2B shows the surface of carbon felt subjected to the process of FIG. 1 while not applying a metal oxide catalyst (Comparative Example 2), and FIG. 2C shows the surface structure of the porous carbon material whose surface is etched by using a metal oxide catalyst (Example 1). FIG. 3 illustrates the energy dispersive X-ray analysis (EDAX) element distribution diagram of the surface of carbon felt (porous carbon material) after etching. FIG. 4 is a transmission electron microscopic (TEM) image of the surface of carbon felt etched by using a catalyst for etching.

Referring to FIG. 2A-FIG. 2C, it can be seen that FIG. 2A illustrating the SEM image of the sample of carbon felt heat-treated at 500° C. under air for 1 hour shows little change in surface. Meanwhile, FIG. 2B illustrates the SEM image of the sample according to Comparative Example 2, i.e., carbon felt subjected to the same heat-treatment process as the catalytic etching while not applying a catalyst to the carbon felt surface. FIG. 2B shows a surface condition similar to Comparative Example 1 (FIG. 2A), i.e., carbon felt heat-treated at 500° C. under air. Therefore, it can be seen that a simple heat-treatment process alone causes no change in surface of carbon felt. Meanwhile, FIG. 2C illustrates the SEM image of the porous carbon material according to Example 1, i.e. carbon felt etched through heat-treatment after a catalyst for etching is supported on the carbon material. It can be seen from FIG. 2C that the surface of carbon felt is etched uniformly to form rod-shaped porous nano-structures. Therefore, it can be seen that the catalyst for etching, i.e., metal oxide is used as a catalyst for etching carbon.

In addition, it can be seen from FIG. 3 that the metal catalyst, cobalt (Co), is distributed uniformly on the surface of carbon felt.

Meanwhile, referring to FIG. 4, it can be seen that the metal oxide catalyst particles having a size of 10-20 nm are distributed uniformly in the etching portion. In addition, when carrying out catalytic etching under the condition of Example 1, the metal oxide catalyst is distributed at an interval of about 10-20 nm. It can be also seen that nano-rod-like porous structures having a length of about 200 nm and a thickness of 10-30 nm are formed on the surface of carbon felt. As a result, it can be seen that the catalytic etching process according to Example 1 does not cause selective etching of a specific portion depending on carbon crystal structure but accomplishes etching at a portion where the catalyst exists.

Test Example 2: Determination of Change in Surface of Porous Carbon Material Depending on Etching Temperature The porous carbon materials obtained at an etching temperature of 200° C. and 500° C. according to Examples 2 and 3 are observed for their surfaces and are shown in FIG. 5A and FIG. 5B.

Figure 5A:
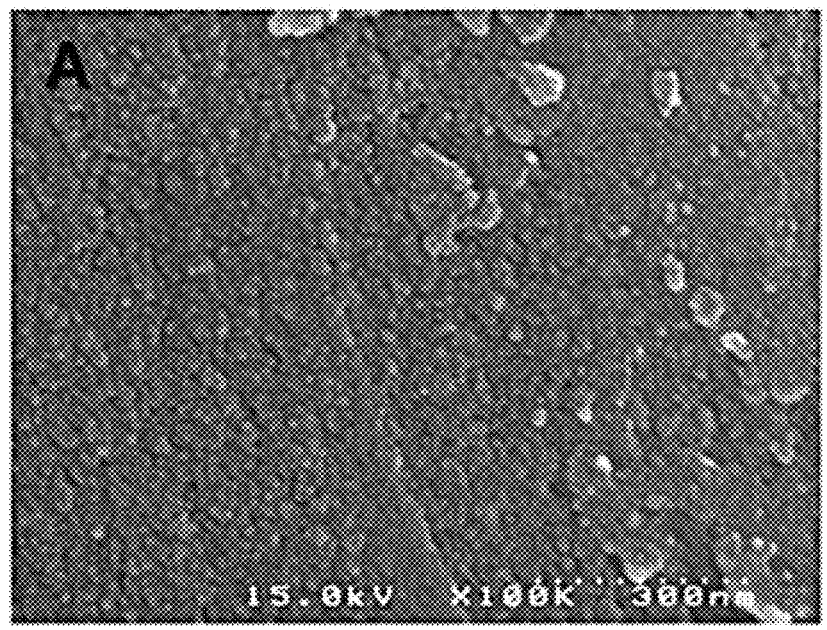
FIG. 5A and FIG. 5B are SEM images illustrating a change in the surface of a porous carbon material depending on a change in etching temperature. Particularly.
Figure 5B:
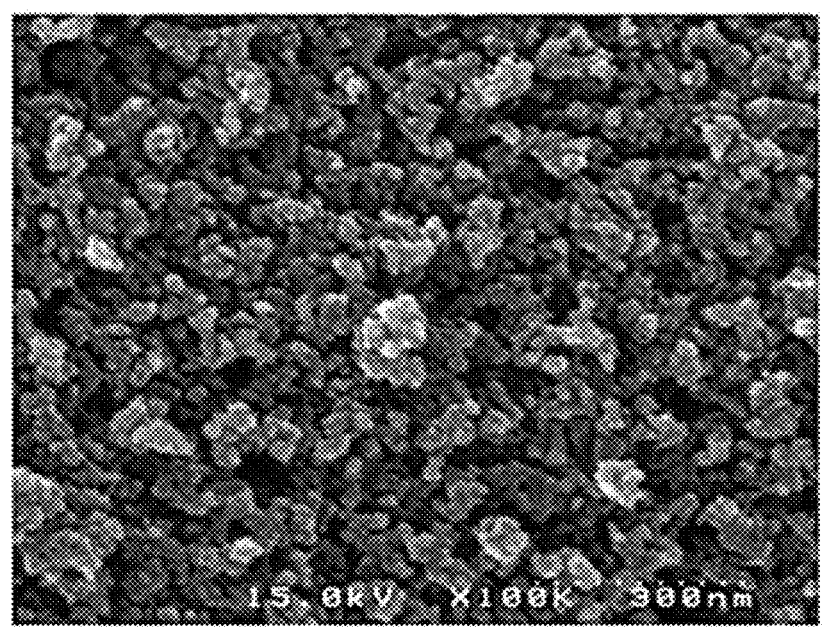

FIG. 5 shows SEM images illustrating a change in surface of a porous carbon material depending on a change in etching temperature. Particularly, FIG. 5A is an SEM image illustrating the surface of the porous carbon material at an etching temperature of 200° C. In addition, FIG. 5B is an SEM image illustrating the surface of the porous carbon material at an etching temperature of 500° C. As compared to FIG. 2c illustrating the porous carbon material obtained at an etching temperature of 400° C. according to Example 1, it can be seen that substantially no etching is accomplished at an etching temperature of 200° C., etching is carried out smoothly at an etching temperature of 400° C. to form porous structures, and etching is carried out excessively at an etching temperature of 500° C. so that the rods disappear and are converted into particle shapes. Therefore, it can be seen that it is required to carry out etching in an adequate temperature range in order to obtain a porous carbon material.

Test Example 3: Determination of Change in Surface of Porous Carbon Material Depending on Etching Time The porous carbon materials according to Examples 1, 4 and 5 are observed for their surfaces and are shown in FIG. 6A-FIG. 6C.

Figure 6A:
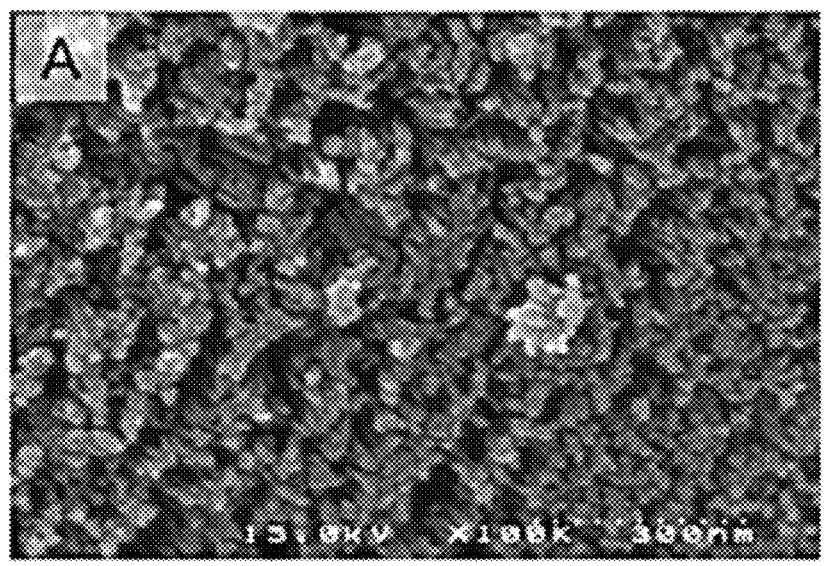
FIG. 6A to FIG. 6C are SEM images illustrating a change in surface of a porous carbon material depending on a change in etching time. Particularly.
Figure 6B:
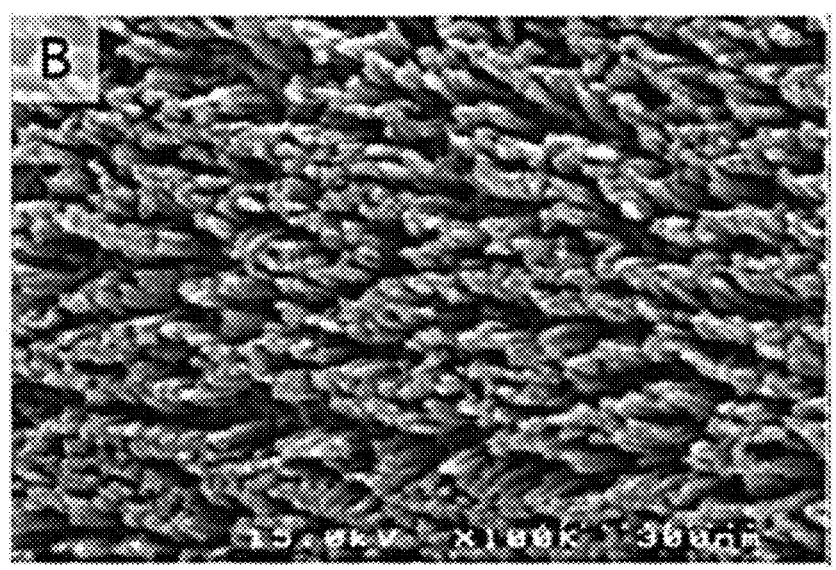
Figure 6C:
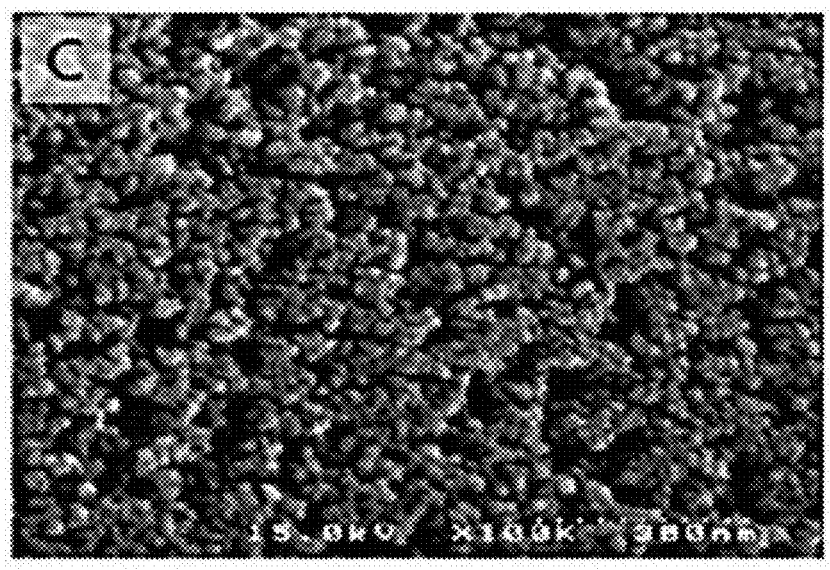

Particularly, FIG. 6A is an SEM image illustrating the surface of the porous carbon material (Example 4) when the etching time is 30 minutes. FIG. 6B is an SEM image illustrating the surface of the porous carbon material (Example 1) when the etching time is 1 hour. In addition, FIG.

6C is an SEM image illustrating the surface of the porous carbon material (Example 5) when the etching time is 2 hours.

Referring to FIG. 6A, it can be seen that etching is carried out weakly after 30 minutes. It can be also seen from FIG. 6B that etching is accomplished to a significantly high degree after 1 hour to form nanorods and to provide porous structures. In addition, as can be seen from FIG. 6C, etching is carried out excessively after 2 hours to cause deformation of the shapes of nano-rods.

Test Example 4: Determination of Change in Surface of Porous Carbon Material Depending on Change in Type of Precursor The porous carbon materials according to Examples 6, 7, 8 and 9 are observed for their surfaces and are shown in FIG. 7A-FIG. 7D.

Figure 7A:
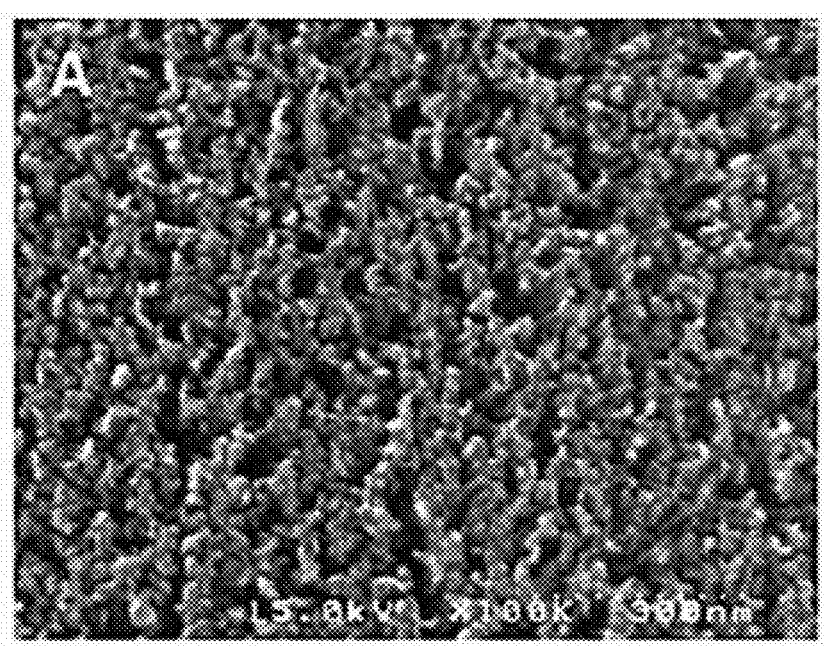
FIG. 7A to FIG. 7D are electron microscopic images illustrating a change in surface of a porous carbon material depending on a change in precursor type. Particularly.
Figure 7B:
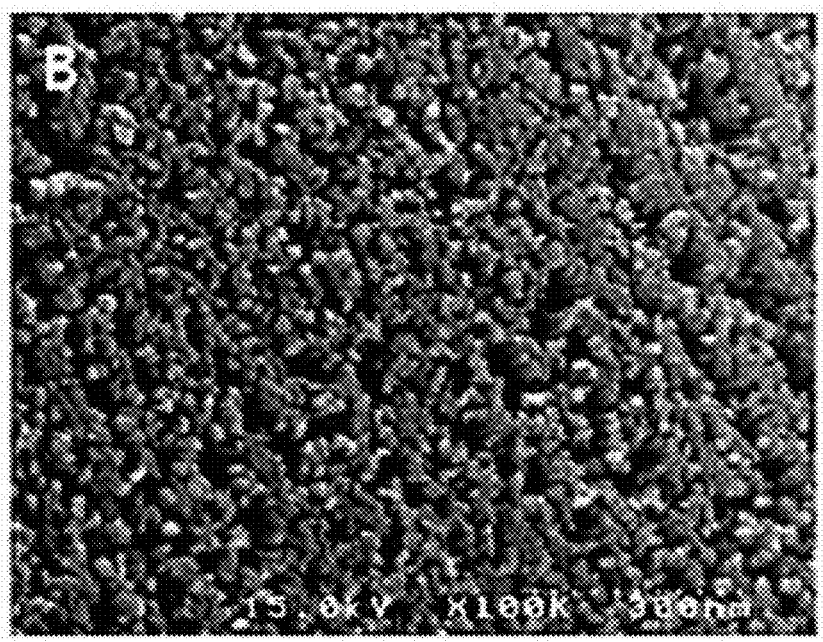
Figure 7C:
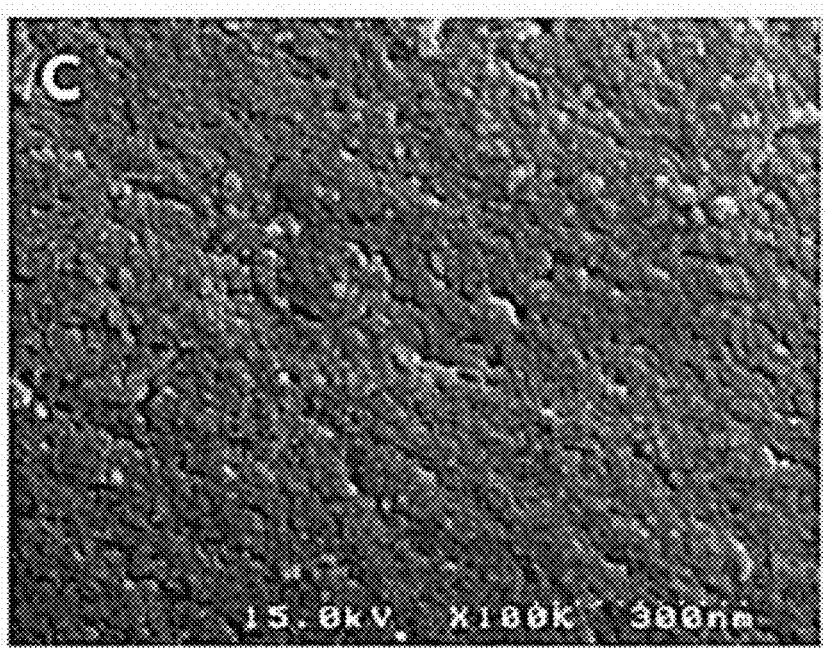
Figure 7D:
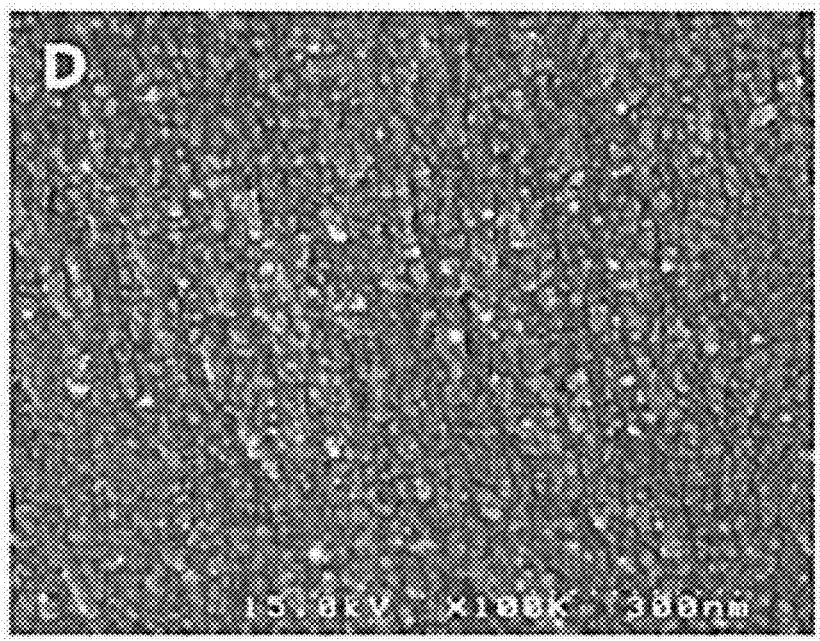

Particularly, FIG. 7A is an SEM image illustrating the surface of the porous carbon material, when cobalt nitrate is used as a precursor. FIG. 7B is an SEM image illustrating the surface of the porous carbon material, when nickel acetate is used as a precursor. FIG. 7C is an SEM image illustrating the surface of the porous carbon material, when iron nitrate is used as a precursor. FIG. 7D is an SEM image illustrating the surface of the porous carbon material, when manganese acetate is used as a precursor.

As can be seen from the surface images of FIG. 7A-FIG. 7D, etching is carried out sufficiently to form nano-structures on the surface significantly, when using a cobalt- or nickel-containing precursor. However, it can be seen that no significant change in surface structure is observed, when using an iron- or manganese-containing precursor. Therefore, it can be seen that etching is carried out more easily when using a cobalt- and/or nickel-containing precursor.

Test Example 5: Determination of Porous Carbon Material when Carrying Out Catalyst Synthesis Simultaneously with Etching The porous carbon material according to Example 10 is observed for its surface and is shown in FIG. 8.

Figure 8:
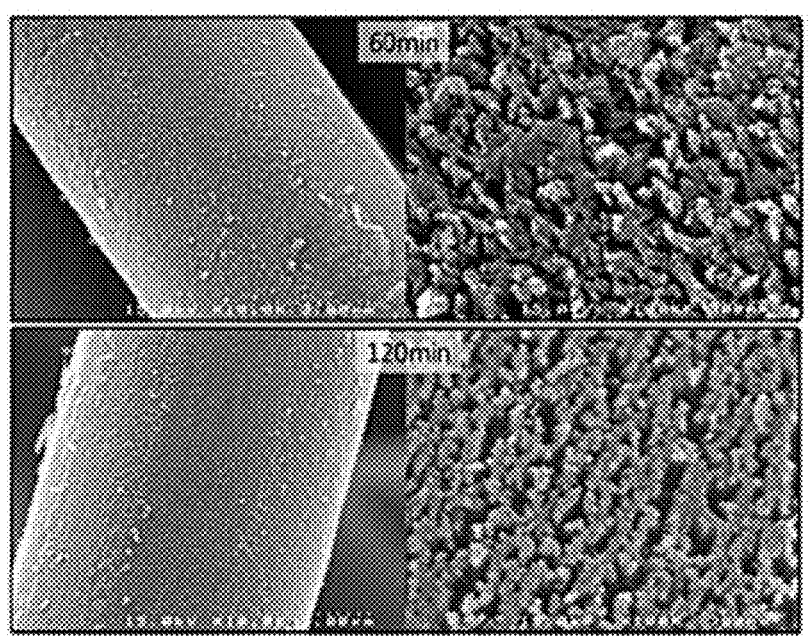
FIG. 8 is SEM images illustrating the surface structure of the porous carbon material according to an embodiment in which synthesis of a metal oxide catalyst and etching of carbon felt are carried out at the same time.

FIG. 8 is an SEM image illustrating the surface structure of the porous carbon material according to an embodiment in which synthesis of a metal oxide catalyst and etching of carbon felt are carried out at the same time.

When comparing FIG. 2c with FIG. 8, it can be seen that use of a continuous process (Example 10) provides porous nano-structures on the surface similarly to a stepwise process (Example 1), but causes a slight difference in uniformity of the surface porous structure.

Test Example 6: Evaluation of Performance of Vanadium Redox Flow Battery

Vanadium redox flow batteries are provided by using the porous carbon material according to Example 1 and the porous carbon material according to Comparative Example 1.

Particularly, each of the porous carbon material (Example 1) and the reference carbon material (Comparative Example 1) is mounted to a different unit cell having an electrode area of 25 cm$^2$ to provide batteries. Herein, 50 mL of an electrolyte containing 1.5M VOSO$_4$/3M H$_2$SO$_4$ is allowed to circulate in each vanadium battery at a rate of 50 mL/min, and each battery is subjected to charge/discharge cycles at a current density of 50 mA/cm$^2$ under a state of charge (SOC) of 80%.

Then, the performance of each battery is determined and the results are shown in the following Table 1.

TABLE 1

| | Current density (%) | Energy efficiency (%) | Voltage efficiency (%) |
|---|---|---|---|
| Comparative Example 1 | 92.8 | 84.2 | 83.8 |
| Example 1 | 96.8 | 88.2 | 91.2 |

It can be seen from Table 1 that the battery using the porous carbon material according to Example 1 shows an energy efficiency increased by about 4% as compared to the battery using conventional carbon felt according to Comparative Example 1. It is thought that such a result is derived from an increase in an electrochemically active surface area of the modified carbon felt and an increase in redox reaction sites of vanadium ions, leading to improvement of redox reversibility of reactant species.

While the exemplary embodiments have been shown and described, it will be understood by those skills in the art that various changes in form and details may be made thereto without departing from the spirit and scope of the present disclosure as defined by the appended claims. In addition, many modifications can be made to adapt a particular situation or material to the teachings of the present disclosure without departing from the essential scope thereof. Therefore, it is intended that the present disclosure not be limited to the particular exemplary embodiments disclosed as the best mode contemplated for carrying out the present disclosure, but that the present disclosure will include all embodiments falling within the scope of the appended claims.

What is claimed is:

1. A porous carbon material comprising:
   carbon nano-rods formed on a surface of a carbon material, wherein the carbon nano-rods have a shape of a column,
   wherein the carbon nano-rods have a height of 10 nm-50 μm and a diameter of 2-1,000 nm, and each carbon nano-rod is spaced apart from adjacent carbon nano-rods among the carbon nano-rods by a distance of 2-1,000 nm, and
   wherein the carbon nano-rods are extended in a longitudinal direction from the surface of the porous carbon material.

2. The porous carbon material according to claim 1, wherein the porous carbon material has a porosity of 1-98%.

3. The porous carbon material according to claim 1, wherein the porous carbon material has a specific surface area of 0.5-3,000 m$^2$/g.

4. The porous carbon material according to claim 1, wherein the carbon nano-rods are formed by etching a carbon material.

5. The porous carbon material according to claim 1, which further comprises carbon nanotubes formed in the pores or on the surface of the carbon nano-rods.

6. The porous carbon material according to claim 1, wherein the carbon material comprises at least one selected from the group consisting of carbon felt, carbon paper, carbon cloth, carbon fibers, hollow carbon fibers, carbon nanotubes, graphene fibers, graphene sheets, graphene oxide fibers, graphene oxide sheets, graphite plates, graphite powder, graphite sheets, carbon black powder, active carbon powder and composite graphite comprising a polymer in combination with graphite.

7. An electrode for electrochemical reaction, comprising the porous carbon material of in claim 1.

8. A method for manufacturing a porous carbon material, comprising:
providing a catalyst for etching the surface of a carbon material; and
etching the carbon material with the catalyst for etching to obtain a porous carbon material comprising carbon nano-rods formed on a surface of the carbon material, wherein the carbon nano-rods have a shape of a column,
wherein the carbon nano-rods have a height of 10 nm-50 µm and a diameter of 2-1,000 nm, and each carbon nano-rod is spaced apart from adjacent carbon nano-rods among the carbon nano-rods by a distance of 2-1,000 nm, and
wherein the carbon nano-rods are extended in a longitudinal direction from the surface of the porous carbon material.

9. The method for manufacturing a porous carbon material according to claim 8, wherein the catalyst for etching comprises at least one selected from the group consisting of nickel (Ni), cobalt (Co), iron (Fe), manganese (Mn), ruthenium (Ru), vanadium (V), titanium (Ti), chromium (Cr), copper (Cu), zinc (Zn), tin (Sn), aluminum (Al), silicon (Si), rhodium (Rh), molybdenum (Mo), zirconium (Zr), tungsten (W), osmium (Os), iridium (Ir) and oxides thereof.

10. The method for manufacturing a porous carbon material according to claim 9, wherein the catalyst for etching further comprises a cocatalyst, and the cocatalyst comprises at least one selected from the group consisting of lithium (Li), potassium (K), sodium (Na), rubidium (Rb), cesium (Ce), magnesium (Mg), calcium (Ca), strontium (Sr), barium (Ba) and radium (Ra).

11. The method for manufacturing a porous carbon material according to claim 8, wherein the porous carbon material has a specific surface area of 0.5-3,000 m²/g.

12. The method for manufacturing a porous carbon material according to claim 8, further comprising:
pretreating a carbon material to carry out surface modification;
dispersing a catalyst precursor on the pretreated carbon material;
heat-treating the catalyst precursor at a temperature of 100-800° C. to form a catalyst for etching on the surface of the carbon material; and
heat-treating the carbon material having the catalyst for etching thereon at a temperature of 250-1,000° C. to form a porous carbon material having carbon nano-rods on the surface thereof.

13. The method for manufacturing a porous carbon material according to claim 12, wherein the surface modification is carried out at a temperature of 200-900° C.

14. The method for manufacturing a porous carbon material according to claim 12, wherein the catalyst precursor comprises at least one selected from the group consisting of metal nitrates, metal acetates, metal sulfates, metal carbonates, metal oxides and metal chlorides.

15. The method for manufacturing a porous carbon material according to claim 12, wherein the carbon material is etched partially to form the carbon nano-rods, when the carbon material having the catalyst for etching thereon is heat-treated.

16. The method for manufacturing a porous carbon material according to claim 8, further comprising, after the porous carbon material is obtained, dispersing a catalyst for forming carbon nanotubes to the porous carbon material, followed by reaction with a carbon source to form carbon nanotubes in the pores or on the surface of the carbon nano-rods.

17. The method for manufacturing a porous carbon material according to claim 16, wherein the catalyst for forming carbon nanotubes comprises at least one selected from the group consisting of nickel (Ni), cobalt (Co), iron (Fe), manganese (Mn), ruthenium (Ru), vanadium (V), titanium (Ti), chromium (Cr), copper (Cu), zinc (Zn), tin (Sn), aluminum (Al), silicon (Si), rhodium (Rh), molybdenum (Mo), zirconium (Zr), tungsten (W), osmium (Os), iridium (Ir) and oxides thereof.

18. The method for manufacturing a porous carbon material according to claim 17, wherein the catalyst for forming carbon nanotubes further comprises a cocatalyst, and the cocatalyst comprises at least one selected from the group consisting of lithium (Li), potassium (K), sodium (Na), rubidium (Rb), cesium (Ce), magnesium (Mg), calcium (Ca), strontium (Sr), barium (Ba) and radium (Ra).

* * * * *